J. J. GORMAN.
Sewer-Inlet Valve.
No. 208,809. Patented Oct. 8, 1878.
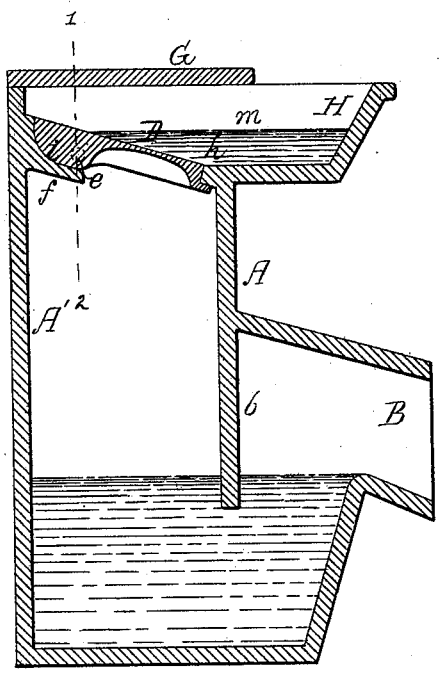
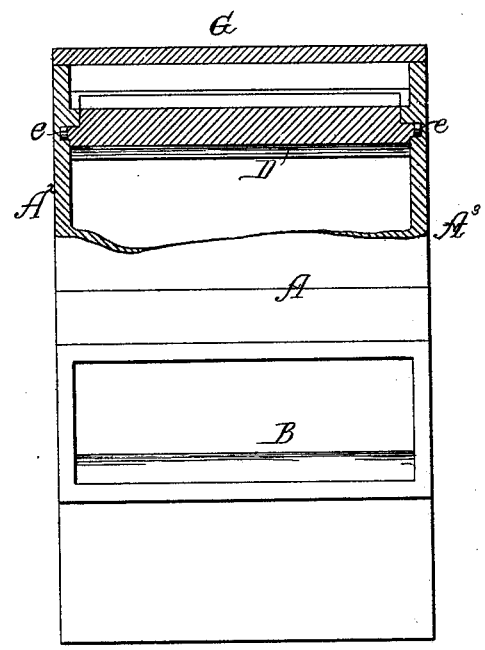
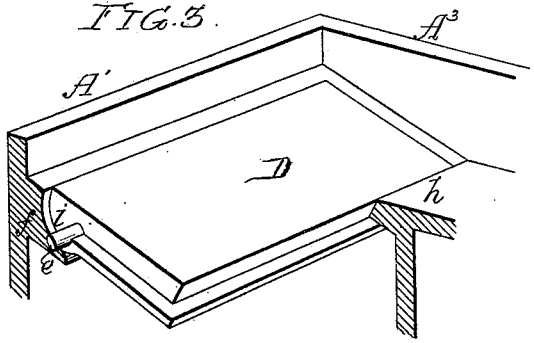
Witnesses.
John M. Deemer
Harry Smith
Inventor:
John J. Gorman
by his Attorneys
Howson and Son

UNITED STATES PATENT OFFICE.

JOHN J. GORMAN, OF PHILADELPHIA, PENNSYLVANIA.

IMPROVEMENT IN SEWER-INLET VALVES.

Specification forming part of Letters Patent No. 208,809, dated October 8, 1878; application filed September 17, 1878.

*To all whom it may concern:*

Be it known that I, JOHN J. GORMAN, of Philadelphia, Pennsylvania, have invented a new and useful Improvement in Sewer-Inlets, Silt-Basins, &c., of which the following is a specification:

The object of my invention is to combine, with an inlet or silt basin, a valve which, while it permits the free access of water from the gutter, will effectually prevent the escape of the noxious vapors emanating from the water in the trap at the bottom of the inlet and from the sewers.

In the accompanying drawing, Figure 1 is a vertical section of an inlet with my improvement; Fig. 2, a transverse section of the upper portion of the inlet on the line 1 2, Fig. 1; and Fig. 3, a perspective view of the valve.

A is the front, $A^1$ the rear, $A^2$ and $A^3$ the opposite sides, G the top, and $m$ the mouth, of the inlet or silt basin, from which projects a branch, B, communicating with the sewer. The lower portion of the inlet is formed into a trap by the downward extension $b$ of the front A of the inlet, in the usual manner, this trap being designed for the purpose of excluding from the inlet the noxious vapors in the sewer—a duty which it does not effectually perform, for the water lodged in the trap being more or less foul, the vapors emanating from it in the summer months pass through the mouth of the inlet, as usually constructed, to the annoyance and danger of those residing in its localtity. More than this, the wind frequently gains access to the sewers, and, charged with noxious vapors, displaces the water in the traps of the inlets and passes through the mouths of the same. The evaporation of the water in the trap in dry weather also permits the noxious gases to pass from the sewer and escape from the mouth of the inlet. In order to obviate these evils, I apply to the interior of the inlet, below the top G, a valve, D, inclined downward to the lower edge of the mouth $m$, the valve having at its opposite ends trunnions or pivots adapted to recesses in the opposite sides $A^2$ $A^3$ of the said inlet. These trunnions or pivots of the valve are so situated, and the metal of which the valve is composed is so distributed, that there shall be a slight preponderance at the rear of the pivots, so that the valve has a tendency to rest in the inclined position shown on its seat, formed by a ledge, $f$, at the rear, and by ledges $h$ at the front and sides, of the inlet, the valve being preferably rabbeted, as shown in the perspective view, so as to insure a close fit against these ledges.

In case of a shower, the water from the gutter H will pass into the mouth of the inlet, and its weight on the valve will be such as to overbalance the latter to such an extent as to present an opening for the passage of water. The size of the opening presented will be commensurate with the volume of the water, which, in passing through the opening, prevents the upward escape of the deleterious vapors, the valve continuing to bar the egress of the latter at other points, for the rounded under side $i$ of the rear of the valve continues to bear on the ledge $f$ under all circumstances, the trunnions of the valve being loose enough in their bearings to permit this. Hence the vapors cannot escape at the rear of the valve, and the latter fits too snugly to the sides of the inlet to permit the escape of the vapors between these sides and the ends of the valves. As the volume of water in the gutter is reduced the valve will gradually close, and will finally reach its seat, when the flow of water in the gutter ceases.

I claim as my invention—

1. The combination, with an inlet or silt basin, of an inclined self-closing valve, D, pivoted within the said inlet, and arranged in respect to the mouth $m$ of the same, all substantially as set forth.

2. The combination of the inlet and its ledge $f$ with the pivoted valve D, having on its under side a rounded enlargement, $i$, bearing on the said ledge, all as set forth.

In testimony whereof I have signed my name to this specification in the presence of two subscribing witnesses.

JOHN J. GORMAN.

Witnesses:
HARRY A. CRAWFORD,
HARRY SMITH.